(12) United States Patent
Zhu

(10) Patent No.: US 8,205,001 B1
(45) Date of Patent: Jun. 19, 2012

(54) DIGITAL RIGHTS MANAGEMENT INTEGRATED SERVICE SOLUTION

(75) Inventor: Weiwen Zhu, Overland Park, KS (US)

(73) Assignee: Sprint Communications Company L.P., Overland Parks, KS (US)

( * ) Notice: Subject to any disclaimer, the term of this patent is extended or adjusted under 35 U.S.C. 154(b) by 0 days.

(21) Appl. No.: 12/483,127

(22) Filed: Jun. 11, 2009

Related U.S. Application Data

(63) Continuation of application No. 10/812,532, filed on Mar. 30, 2004, now Pat. No. 7,565,438.

(51) Int. Cl.
G06F 15/16 (2006.01)
G06F 7/04 (2006.01)
H04L 29/08 (2006.01)

(52) U.S. Cl. ........ 709/230; 709/203; 726/26; 455/414.4

(58) Field of Classification Search .................. 709/203, 709/230; 726/26; 455/414.4
See application file for complete search history.

(56) References Cited

U.S. PATENT DOCUMENTS

| | | | |
|---|---|---|---|
| 5,848,415 A | 12/1998 | Guck | |
| 7,020,685 B1 | 3/2006 | Chen et al. | |
| 7,089,429 B2 * | 8/2006 | Gustafsson | 726/26 |
| 7,177,843 B2 * | 2/2007 | Nguyen et al. | 705/51 |
| 7,421,411 B2 | 9/2008 | Kontio et al. | |
| 7,565,438 B1 | 7/2009 | Zhu | |
| 2002/0184527 A1 | 12/2002 | Chun et al. | |
| 2003/0163569 A1 | 8/2003 | Panasyuk et al. | |
| 2003/0214943 A1 | 11/2003 | Engstrom et al. | |
| 2003/0228866 A1 | 12/2003 | Pezeshki | |
| 2003/0236890 A1 | 12/2003 | Hurwitz et al. | |
| 2003/0236978 A1 | 12/2003 | Evans et al. | |
| 2004/0006725 A1 | 1/2004 | Lakshmanamurthy et al. | |
| 2004/0016000 A1 | 1/2004 | Zhang et al. | |
| 2004/0019689 A1 | 1/2004 | Fan | |
| 2004/0019693 A1 | 1/2004 | Grow et al. | |
| 2004/0032881 A1 | 2/2004 | Arai | |
| 2004/0093595 A1 * | 5/2004 | Bilange | 717/171 |
| 2004/0170155 A1 | 9/2004 | Omar et al. | |
| 2005/0027871 A1 | 2/2005 | Bradley et al. | |
| 2005/0044016 A1 | 2/2005 | Irwin et al. | |
| 2005/0044388 A1 | 2/2005 | Brant et al. | |
| 2005/0071280 A1 | 3/2005 | Irwin et al. | |
| 2005/0172154 A1 * | 8/2005 | Short et al. | 713/201 |
| 2007/0283423 A1 * | 12/2007 | Bradley et al. | 726/4 |

OTHER PUBLICATIONS

Office Action dated Oct. 17, 2007, 17 pages, U.S. Appl. No. 10/812,532, filed Mar. 30, 2004.
Final Office Action dated Apr. 30, 2008, 19 pages, U.S. Appl. No. 10/812,532, filed Mar. 30, 2004. Advisory Action dated Aug. 1, 2008, 3 pages, U.S. Appl. No. 10/812,532, filed Mar. 30, 2004.
Office Action dated Oct. 14, 2008, 11 pages, U.S. Appl. No. 10/812,532, filed Mar. 30, 2004.
Notice of Allowance dated Mar. 16, 2009, 7 pages, U.S. Appl. No. 10/812,532, filed Mar. 30, 2004.

* cited by examiner

Primary Examiner — Ranodhi Serrao

(57) ABSTRACT

The present disclosure provides a system for accessing content secured according to differing digital rights management protocols. The system comprises a device that presents the content and a client component loaded on the device that uses and requests content according to a first digital rights management protocol. The system includes a first content server that receives a request for and provides content according to the first digital rights management protocol and a second content server that receives a request for and provides content according to a second digital rights management protocol. A mediation component maps requests and responses between the client component and the second content server, mediating between the first and second digital rights management protocols. The disclosure contemplates mediating between open digital rights language (ODRL) and extensible right markup language (XRML) digital rights management protocols as well as other digital rights management protocols.

12 Claims, 4 Drawing Sheets

DIGITAL RIGHTS MANAGEMENT INTEGRATED SERVICE SOLUTION

CROSS-REFERENCE TO RELATED APPLICATIONS

This application is a continuation of and claims priority to U.S. patent application Ser. No. 10/812,532, filed Mar. 30, 2004 now U.S. Pat. No. 7,565,438 B1, issued Jul. 21, 2009 and entitled "Digital Rights Management Integrated Service Solution," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software, and more particularly, but not by way of limitation, to a system and method for digital rights management.

BACKGROUND OF THE INVENTION

Traditional rights management of physical materials benefits from the physical nature of the material being protected, as this provides some limitation to the ease with which this content can be copied or otherwise stolen. Digital files, however, can be very easily copied, and already copyright violations are widespread, as for example illegal downloading of music files. Digital rights management (DRM) technology addresses the need to identify, protect, monitor, and track digital materials and their use.

Several DRM protocols or standards have emerged to support secure, authorized access to digital materials including extensible rights markup language (XrML), open digital rights language (ODRL), a Sony proprietary content management protocol, and an Apple Computer proprietary content management protocol, just to name a few.

DRM protocols permit a device to download a digital file from a content provider and to access this file, for example a digital music file, a fixed number of times within a fixed time window in exchange for charging a fee to a credit card or to an account with the content provider. For example, an individual might download a song performed by a popular artist to an Internet enabled audio system for five plays over the next seven days.

SUMMARY OF THE INVENTION

The present disclosure provides, according to one embodiment, a system for accessing content secured according to differing digital rights management protocols. The system comprises a device that presents the content, and a client software component loaded on the device that uses and requests content according to a first digital rights management protocol. The system includes a first content server that receives a request for and provides content according to the first digital rights management protocol, and a second content server that receives a request for and provides content according to a second digital rights management protocol. A mediation component maps requests and responses between the client software component and the second content server, mediating between the first and second digital rights management protocols. The disclosure contemplates mediating between open digital rights language and extensible right markup language protocols as well as other digital rights management protocols.

In one embodiment, a system is provided for executing a computer program on a wireless mobile device by loading the computer program into the wireless mobile device, either wholly or in a sequence of segments, at the time the wireless mobile device desires to execute the computer program. The system comprises a wireless communication network and an application server which receives a request for a segment of the program or the whole program and returns the segment of the program or the whole program. The system also includes a mobile device which desires to execute the computer program and requests that the application server provide a segment of the program or the whole program over the wireless communication network. The wireless communication network may include a base transceiver station in radio communication with the wireless mobile device, a base station controller in communication with the base transceiver station, and a mobile switching center in communication with the base transceiver station. The mobile switching center is in communication with either the public switched telephone network or the packet data network. The application server attaches to the wireless network either through the packet data network or the public switched telephone network.

In one embodiment, a method is provided for executing a computer program on a wireless mobile device by loading the program into the wireless mobile device, either wholly or in a sequence of segments, at the time the wireless mobile device desires to execute the program. The method comprises downloading a part of the program to the wireless mobile device from the wireless network, executing the part of the program, downloading the next part of the program to the wireless mobile device, executing this next part of the program, and so on until as much of the program as is desired is executed.

In one embodiment, a system for accessing content according to any of several content management protocols is disclosed. The system comprises a first mobile device which can present content and a client software component installed in the first mobile device which can use the content according to a first content management protocol. The system also includes a second mobile device which can present content and a client software component installed in the second mobile device which can use the content according to a second content management protocol. The system includes a multi-protocol content server in communication with the first and second mobile devices which is able to receive content requests and provide content according to the several content management protocols.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Digital rights management (DRM) technology addresses the need to identify, protect, monitor, and track digital materials and their use. Digital materials may be referred to as content and may include text content, audio content, video content, music content, audio/video content, and encrypted content. With several competing DRM standards or protocols deployed to secure and manage access to content, the need for devices to interoperate with different DRM protocols arises. For example, if a listener attempts to download a music audio to an ODRL based playback device from a content provider who has chosen to protect and manage content using XrML, the attempt will fail. Intelligent devices with large resources may be able to store DRM client programs to interact with several prevalent DRM protocols concurrently. Mobile devices or low cost devices, however, may have limited memory resources and may be capable of storing only one DRM client program supporting a single DRM protocol.

Figure 1:
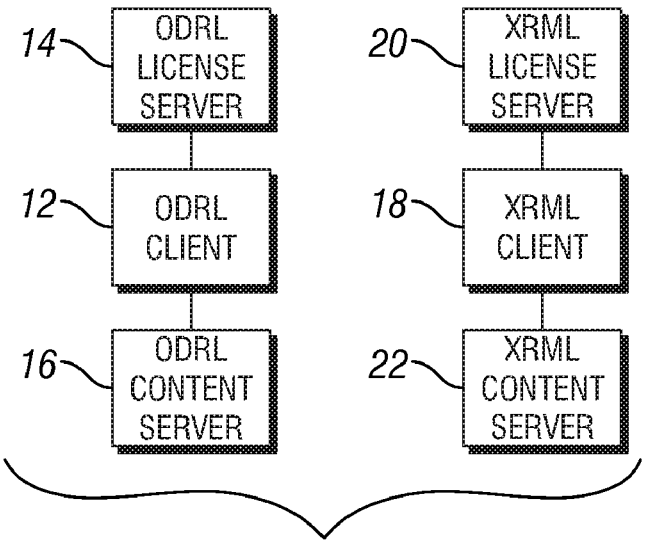
FIG. 1 is a block diagram that depicts digital rights management (DRM) clients in communication with DRM license servers and DRM content servers.

Turning now to FIG. 1, a block diagram depicts the prior art for ODRL and XrML access to content. An ODRL client 12 is in communication with an ODRL license server 14 and with an ODRL content server 16. The ODRL client 12 requests a content license or digital certificate from the ODRL license server 14, and the ODRL license server 14 returns the license or digital certificate to the ODRL client 12. The ODRL client 12 requests content from the ODRL content server 16, sending the license or digital certificate encapsulated in this request. The ODRL content server 16 returns the content to the ODRL client 12 along with a rights statement. A rights statement describes the content access rights granted to the ODRL client 12 which may include details specifying how the ODRL client 12 may use the content (view, copy, or print), how many times the ODRL client 12 may use the content, and a period of time over which these rights are granted to the ODRL client 12. The ODRL client 12 consumes the content (viewing the content, playing the content, or otherwise using the content) and sends a usage report to the ODRL license server 14.

An XrML client 18 is in communication with an XrML license server 20 and with an XrML content server 22. The XrML client 18 requests a content license or digital certificate from the XrML license server 20, and the XrML license server 20 returns the license or digital certificate to the XrML client 18. The XrML client 18 requests content from the XrML content server 22, sending the license or digital certificate encapsulated in this request. The XrML content server 22 returns the content to the XrML client 18 along with a rights statement describing the content access rights granted to the XrML client 18. The XrML client 18 consumes the content and sends a usage report to the XrML license server 20.

At this level of detail, the general interactions to obtain access to content are similar. However, the ODRL client 12 is not able to access the XrML content managed by the XrML content server 22, and the XrML client 18 is not able to access ODRL content managed by the ODRL content server 16 due to incompatibilities between the two protocols. Similar incompatibilities may prevent interoperation among other DRM standards or protocols.

Figure 2:
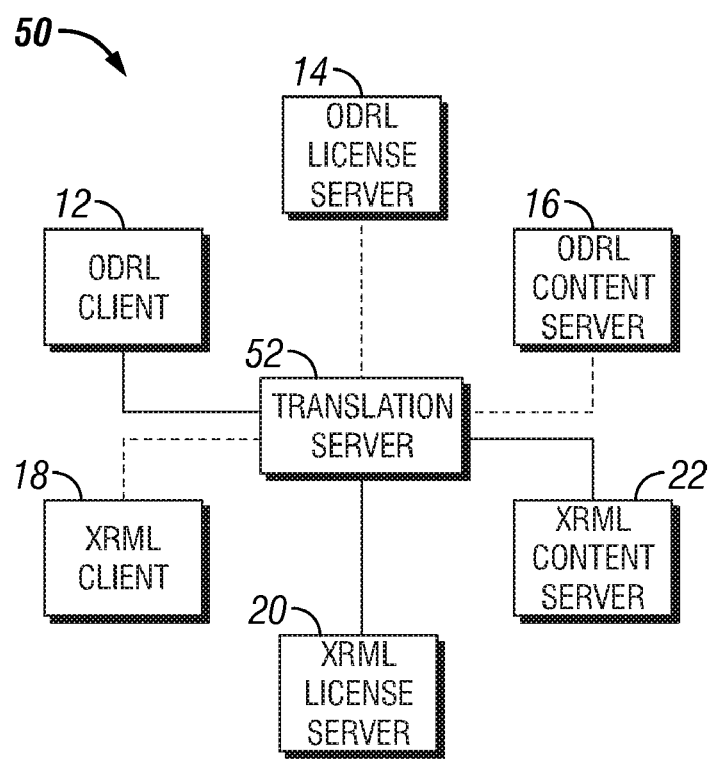
FIG. 2 is a block diagram that depicts a DRM integrated access system according to one embodiment.

Turning now to FIG. 2, a DRM integrated access system 50 is depicted. The present disclosure may employ multiple license servers, such as a first license server and a second license server, where for example, the first license server may be the ODRL license server 14 and the second license server may be the XrML license server 20. It will be appreciated however that the other types and/or combinations of license servers may be used as well. A translation server 52, which may also be referred to as a mediation component, is in communication with the ODRL client 12, the ODRL license server 14, the ODRL content server 16, the XrML client 18, the XrML license server 20, and the XrML content server 22. The translation server 52 is operable to map, translate, or mediate requests for content according to a first content management protocol into a request for content according to a second content management protocol. The translation server 52 is further operable to map, translate, or mediate responses according to the second content management protocol into responses according to the first content management protocol.

For example, when the ODRL client 12 requests a content from the XrML content server 22 it sends an ODRL based license request to the translation server 52. The translation server 52 sends a XrML based license request to the XrML license server 20. The XrML license server 20 returns an XrML license for accessing the requested XrML content. The translation server 52 mediates this XrML license into an ODRL based license and returns this to the ODRL client 12.

The ODRL client 12 sends an ODRL based content request, including the ODRL based license or digital certificate, to the translation server 52. The translation server 52 mediates this ODRL based content request and encapsulated ODRL based license into a XrML based content request and an encapsulated XrML based license. The XrML content server 22 returns the content with an associated rights statement to the translation server 52 in accordance with the XrML content management protocol. The translation server 52 mediates the XrML content and associated rights statement to the content and associated rights statement according to the ODRL content management protocol. In some embodiments, authorization may be required from the content provider prior to mediation or translation.

The ODRL client 12 consumes the content according to the restrictions of the rights statement and sends usage reports to the translation server 52 in accordance with the ODRL content management protocol. The translation server 52 mediates the ODRL based usage reports to XrML based usage reports and forwards the XrML based usage reports to the XrML license server 20.

The process for mediating a XrML client 18 request for content from the ODRL content server 16 is a reflection of the above described process. In general, the translation server 52 or mediation component maps, mediates, or translates requests and responses according to one content management protocol to requests and responses in another content management protocol.

The ODRL license server 14, the ODRL content server 16, the XrML license server 20, the XrML content server 22, and the translation server 52 may be computer programs or applications which may run on a general purpose computer system. The ODRL client 12 and the XrML client 18 are computer programs or applications which, for purposes of understanding this disclosure, may be assumed to run on general purpose computer systems. In some embodiments the ODRL client 12 and the XrML client 18 may execute on wireless mobile devices. General purpose computer systems are discussed in greater detail herein after.

FIG. 2 depicts the translation server 52 mediating between XrML based and ODRL based content management and access systems, but it is contemplated that the translation server 52 is able to map between any two or more content management protocols or DRM protocols. The present illustration contemplates other DRM systems and protocols.

Figure 3:
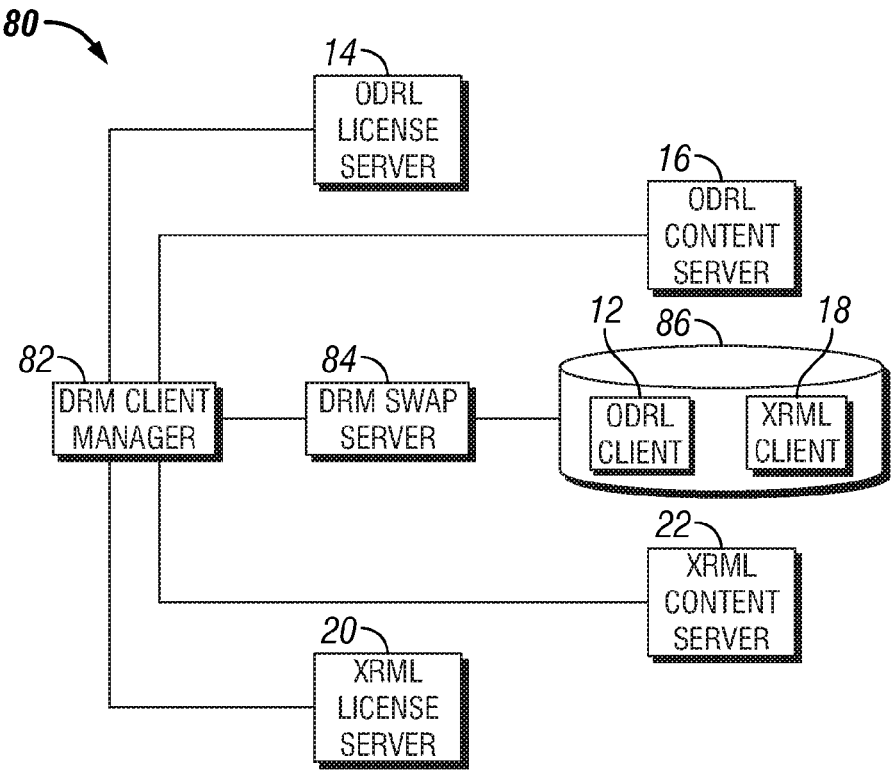
FIG. 3 is a block diagram that depicts the DRM integrated access system according to another embodiment.

Turning now to FIG. 3, an alternate DRM integrated access system 80 is depicted. A DRM client manager 82 is in communication with the ODRL license server 14, the ODRL content server 16, the XrML license server 20, the XrML content server 22, and a DRM swap server 84. The DRM swap server 35 may be an application or computer program which may execute, for example, on a general purpose computer system. The DRM client manager 82 is an application or computer program which, for purposes of understanding this disclosure, may be considered to run on a general purpose computer system. In some embodiments the DRM client manager 82 may run on a mobile wireless device.

When the DRM client manager 82 is deployed on a mobile wireless device, memory resources may be limited and may be unable to store and operate both the ODRL client 12 and the XrML client 18. The DRM swap server 84 is in communication with a database 86 which contains the ODRL client 12 and the XrML client 18 which the DRM client manager 82 requires to access and consume ODRL based content and XrML based content, respectively.

When the DRM client manager 82 needs to access ODRL based content, the DRM client manager 82 first requests the DRM swap server 84 to read the ODRL client 12 from the database 86 and to send the ODRL client 12 to the DRM client manager 82. The DRM client manager 82 loads the ODRL client 12 into the memory of the device, such as, but not limited to, a mobile wireless device. The ODRL client 12 then, under control of the DRM client manager 82, conducts a standard ODRL content access session.

When the DRM client manager 82 needs to access XrML based content, the DRM client manager 82 first requests the DRM swap server 84 to read the XrML client 18 from the database 86 and to send the XrML client 18 to the DRM client manager 82. The DRM client manager 82 loads the XrML client 18 into the memory of the device. The XrML client 18 then, under control of the DRM client manager 82, conducts a standard XrML content access session.

The DRM client manager 82 determines the DRM protocol required to access the ODRL or XrML content servers 16 and 22 either by having the DRM protocol designated to the DRM client manager 82, such as by user input, or by discovering the DRM protocol through a handshaking operation with the ODRL or XrML content servers 16 and 22. The DRM client manager 82 may be considered to contain within it one of the ODRL client 12 and the XrML client 18, which the DRM client manager 82 receives from the DRM swap server 84.

In some embodiments the DRM client manager 82 may first check to see if the needed DRM client, one of the ODRL client 12 and the XrML client 18, is already in memory before fetching and loading, thereby saving time and communication resources if the needed DRM client, either the ODRL client 12 or the XrML 18, is already located in memory.

While FIG. 3 depicts the database 86 containing the ODRL client 12 and the XrML client 18, it is contemplated that the database 86 may contain other DRM clients or content management clients to enable the DRM client manager 82 to interact with other DRM systems or content management systems. Additionally, it is contemplated that the DRM client manager 82 may request portions of the DRM client, one of the ODRL client 12 and the XrML client 18, or content management clients, for example portions of the ODRL client 12 and portions of the XrML client 18, when these portions are needed.

For example, when the DRM client manager 82 requests an ODRL based license, the DRM client manager 82 requests the ODRL based license portion of the ODRL client 12 from the DRM swap server 84. The DRM client manager 82 receives and loads the ODRL based license portion of the ODRL client 12 into memory. The DRM client manager 82 executes this ODRL based license portion of the ODRL client 12. The DRM client manager 82 requests the ODRL license from the ODRL license server 14. The DRM client manager 82 receives the ODRL based license from the ODRL license server 14.

When the DRM client manager 82 requests the ODRL content, the DRM client manager 82 requests the ODRL based content server portion of the ODRL client 12 from the DRM swap server 84. The DRM client manager 82 loads the ODRL based content server portion of the ODRL client 12 into memory. The DRM client manager 82 executes the ODRL based content server portion of the ODRL client 12. The DRM client manager 82 requests the content from the ODRL content server 16. The DRM client manager 82 receives the ODRL based content from the ODRL content server 16.

When the DRM client manager 82 consumes the ODRL based content, the DRM client manager 82 requests the ODRL based content consumption portion of the ODRL client 12 from the DRM swap server 84. The DRM client manager 82 loads the ODRL based content consumption portion of the ODRL client 12 into memory. The DRM client manager 82 executes the ODRL based content consumption portion of the ODRL client 12. The DRM client manager 82 consumes, or plays back, the ODRL based content and sends a usage report to the ODRL license server 14.

This example of segmented ODRL client 12 execution is only exemplary. Other segmentations or partitions, at either a coarser or a finer segmentation granularity, of the DRM clients, for example either the ODRL client 12 or the XrML client, or content management clients may be employed.

Wireless mobile devices, such as mobile phones, may be well suited to the DRM integrated access system 80. Wireless mobile devices may have limited memory resources, and emerging third generation wireless technologies now support data channels featuring relatively high bandwidth adequate to transmit in whole or in segments DRM clients, for example either the ODRL client 12 or the XrML client 18, or content management clients. In one embodiment of the DRM integrated access system 80 the DRM client manager 82 resides on a wireless mobile device.

Figure 4:
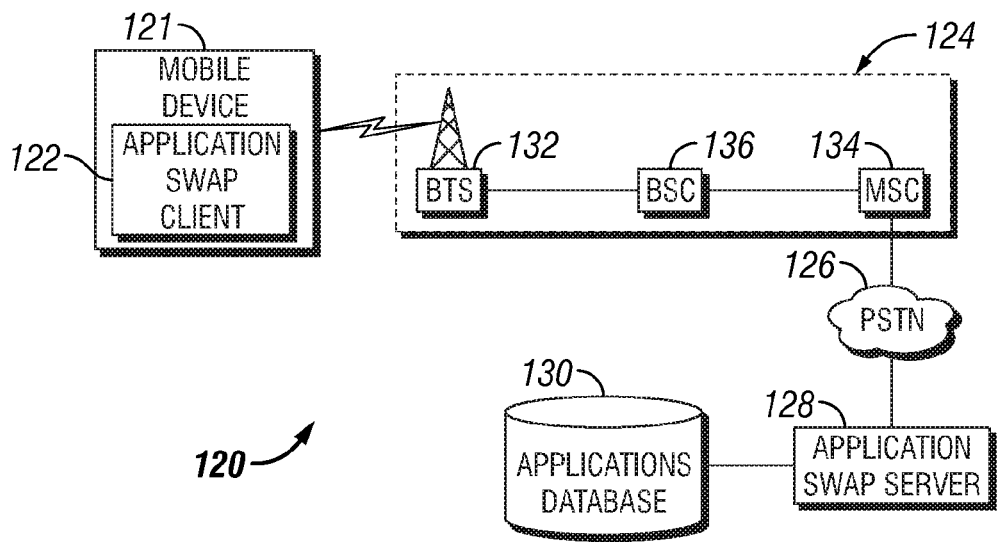
FIG. 4 is a block diagram that depicts a system for loading computer programs on demand from an application swap server to a wireless mobile device.

Turning now to FIG. 4, a system 120 for on-demand loading of computer programs into a wireless mobile device 121 is depicted. The system 120 provides on-demand loading of any computer programs or applications and is not limited to on-demand loading of the digital rights management or content management client applications discussed earlier. The wireless mobile device 121 is in communication with a wireless network 124. The wireless mobile device 121 contains an application swap client 122. The wireless network 124 is in communication with a public switched telephone network (PSTN) 126. The PSTN 126 is in communication with an application swap server 128. The application swap server 128 is in communication with an applications database 130.

The application swap server 128 may be a computer program or application which may execute on a general purpose computer system. The application swap client 122 may be a computer program or application which may execute on the wireless mobile device 121.

The wireless mobile device 121 may need to execute a computer program or application which is not loaded in memory. In this case, the application swap client 122 may interwork with the application swap server 128 to download the application from the applications database 130 to the memory of the wireless mobile device 121. The wireless network 124 and the PSTN 126 provide the communications link between the application swap client 122 and the application swap server 128. The wireless mobile device 121 may then execute the application. It is contemplated that the system 120 may be employed to download complete applications or segments of applications. In one embodiment, the system 120 may be operable for downloading segments of applications. For example, a complete application may be executed by downloading a first segment of the application, executing the first segment of the application, downloading a second segment of the application, executing the second segment of the application, and so on until the last segment of the application is downloaded and executed.

The wireless network 124 may comprise a transceiver in wireless radio communication with the wireless mobile device 121, a bridge node linking to the PSTN 126, such that the transceiver is in communication with the bridge node. The bridge node may link the wireless network to a packet data network (PDN), the PDN may be in communication with the application swap server 128, and the wireless mobile device 121 may be in communication with the application swap server 128 via the wireless network 124 and the PDN.

In one embodiment, a base transceiver station (BTS) 132 is in radio communication with the application swap client 122, a mobile switching center (MSC) 134 bridges the wireless network 124 to the PSTN 126, and a base station controller (BSC) 136 links the BTS 132 with the MSC 134.

In another embodiment, the BTS 132 is in radio communication with the wireless mobile device 121, a gateway global packet radio system support node (GGSN) bridges the wireless network 124 to the PDN, a base station controller (BSC) 136 links the BTS 132 to a serving global packet radio system support node (SGSN), and the SGSN is in communication with the GGSN.

Other wireless network topologies are also possible. The construction of wireless networks is well understood by those skilled in the art. The system 120 employs the wireless network 124 merely as a link between the wireless mobile device 121 and the application swap server 128.

Figure 5:
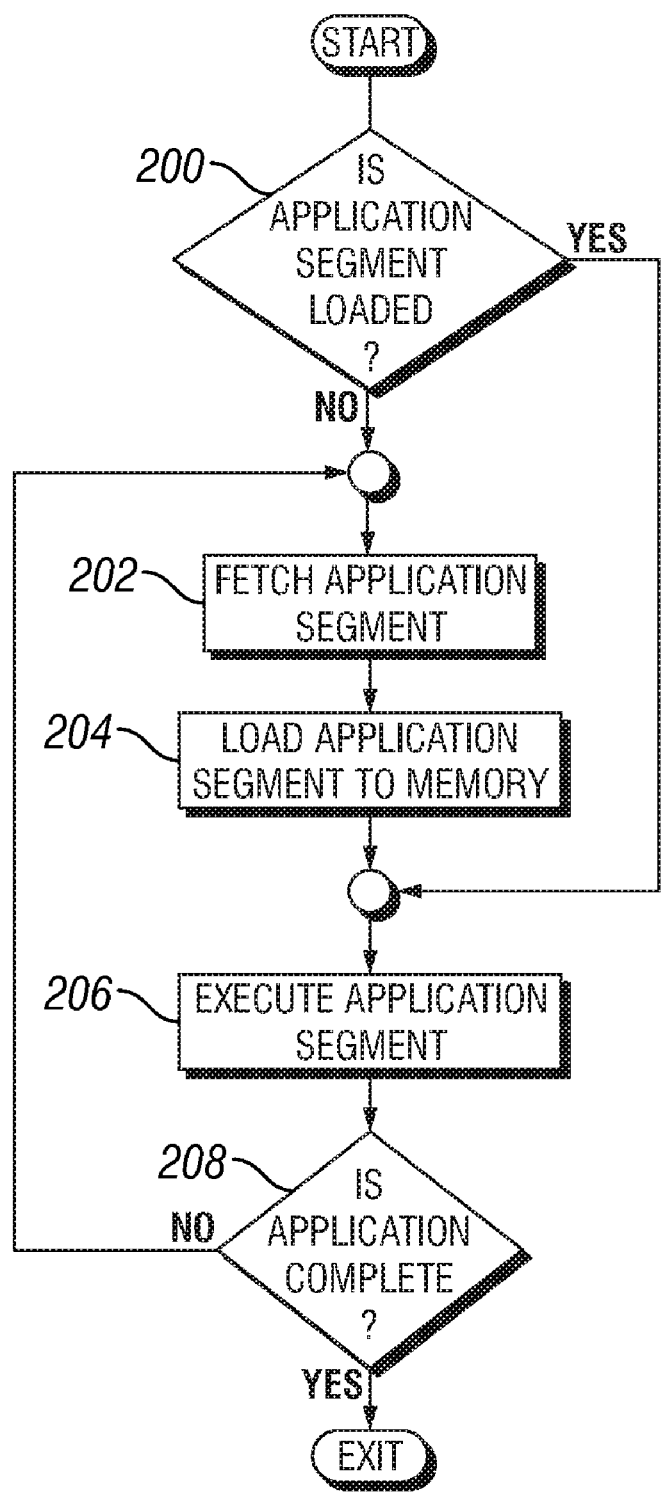
FIG. 5 is a flow chart that depicts a method for loading computer programs on demand to the wireless mobile device.

Turning now to FIG. 5, a method for on-demand loading of computer programs or applications into the wireless mobile device 121 is depicted. At block 200, the method determines whether the application segment is loaded, and whether authentication has been received. Where the application segment has not been loaded, but is authenticated, the process proceeds to block 202 where the appropriate application segment is fetched. The process proceeds to block 204 where the application segment is loaded into memory. The process proceeds to block 206 where the application segment is executed. If, at block 200, the appropriate application segment is determined to be loaded already, the processing proceeds to block 206, thus bypassing the fetch and load processing blocks 202 and 204 respectively.

From block 206 the process proceeds to block 208 where the process exits if the application is complete. If the application is not complete, the process proceeds to block 202 and the fetch, load, and execute cycle of blocks 202, 204, and 206 are repeated.

This process permits nearly any computer program or application to be executed on the application swap client 122. Alternate processes may be employed for applications that do not tolerate being segmented.

Figure 6:
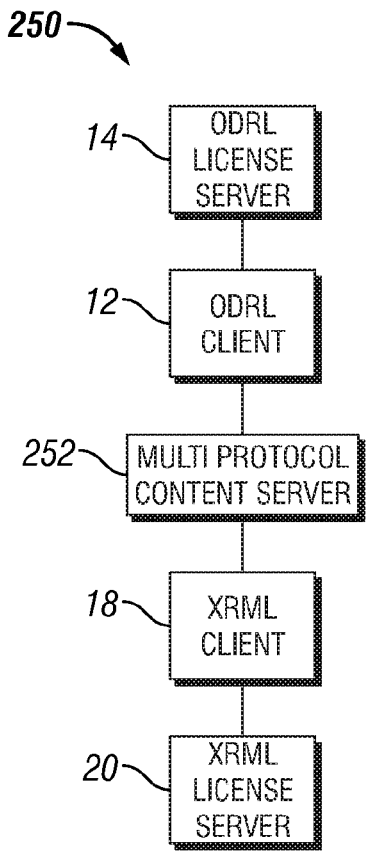
FIG. 6 is a block diagram that depicts the DRM integrated access system according to another embodiment.

Turning now to FIG. 6, an alternate DRM integrated access system 250 is depicted. A multiprotocol content server 252 serves the content to the ODRL client 12 and to the XrML client 18 according to the content management protocol suited to each device. Thus, when the ODRL client 12 requests content from the multimode content server 252, the multiprotocol content server 252 accepts the ODRL based license embedded in the request and returns the content according to the ODRL protocol. When the XrML client 18 requests content from the multiprotocol content server 252, the multiprotocol content server 252 accepts the XrML based license embedded in the request and returns the content according to the XrML protocol.

While FIG. 6 depicts ODRL and XrML based devices and license servers, the DRM integrated access system 250 is contemplated to interwork with other content management protocols as well. The multiprotocol content server 252 may be a computer program or application which may be executed on a general purpose computer.

Figure 7:
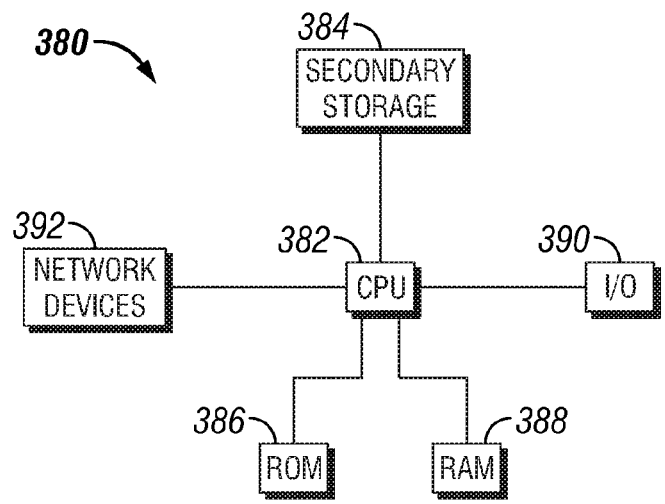
FIG. 7 is a block diagram that depicts an exemplary general purpose computer system suitable for implementing the several embodiments of the disclosure.

The systems described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

Content providers want to secure their economic interests and protect their content rights. Content consumers want to access content conveniently. It is not in the interests of either content providers or content consumers that incompatible DRM protocols create barriers between them. The several embodiments described above provide, for example, useful techniques for overcoming these DRM protocol barriers and connecting content consumers with content providers.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system for wirelessly accessing content and applications to play or use the content, comprising:
   a mobile device configured to request the content, comprising:
      a memory configured to store less than all of a plurality of applications at a time, wherein each of the plurality of applications is configured to play or use the content according to a corresponding one of a plurality of content management protocols, and wherein the plurality of applications comprises an application configured to play or use content according to the open digital rights language protocol and an application configured to play or use content according to the extensible rights markup language protocol; and
      a content consumption component configured to play or use the content using one of the plurality of applications that is stored in the memory;
   a swapping component configured to receive a request for any one of the plurality of the applications and to communicate the requested one of the plurality of applications to the mobile device for storage in the memory and use by the content consumption component; and
   a content component configured to receive a request for the content from the mobile device and to communicate the content to the mobile device according to a first of the plurality of content management protocols,
   wherein the swapping component receives a request for and communicates a first of the plurality of applications to the mobile device for storage in the memory and use by the content consumption component to play or use the content according to the first of the plurality of content management protocols.

2. The system of claim 1, wherein the mobile device further comprises:
   an application manager configured to request one of the plurality of applications not stored in the memory from the swapping component, and
   wherein the swapping component provides the requested one of the plurality of applications to the mobile device in response to the request from the application manager.

3. The system of claim 2, wherein the application manager is further configured to determine which of the plurality of applications to request in order to access the content on the content component by one of receiving a designation of the one of the plurality of applications or discovering the one of the plurality of applications through communication with the content component.

4. The system of claim 1, wherein the memory is configured to only store one of the plurality of applications at a time.

5. The system of claim 1, further comprising:
   a second content component configured to receive a second request for second content from the mobile device and to communicate the second content to the mobile device according to a second of the plurality of content management protocols,
   wherein the swapping component provides a second of the plurality of applications to the mobile device to present the second content with the content presentation device according to the second of the plurality of content management protocols.

6. The system of claim 1, wherein the content is further defined to be selected from at least one of the group consisting of text, audio, video, music, audio/video, and encrypted contents.

7. A method for providing content management clients to a mobile device to access and play content secured according to different content management protocols, comprising:
   receiving by a swapping component a request from the mobile device for one of a plurality of content management clients, wherein each of the different content management clients is configured to play content according to a corresponding one of the different content management protocols, and wherein the plurality of content management clients comprises a content management client configured to play content according to the open digital rights language protocol and a content management client configured to play content according to the extensible rights markup language protocol;

obtaining by the swapping component the requested content management client from a component that maintains the different content management protocols; and communicating by the swapping component the requested content management client to the mobile device, wherein the mobile device has limited memory resources and is only capable of storing less than all of the plurality of content management clients at a time.

8. The method of claim 7, wherein the mobile device is only capable of storing one of the plurality of content management clients at a time.

9. The method of claim 7, wherein the content is selected from at least one of the group consisting of text, audio, video, music, audio/video, and encrypted contents.

10. The method of claim 7, wherein the plurality of content management clients are programs.

11. The method of claim 7, further comprising:

receiving by the swapping component a request from the mobile device for a portion of one of the plurality of content management clients;

obtaining by the swapping component the requested portion of the one of the plurality of content management clients from a component that maintains the different content management protocols; and communicating by the swapping component the requested portion of the content management client to the mobile device.

12. A method for providing content management clients to a mobile device to access and use content secured according to different content management protocols, comprising:

receiving by a swapping component a request from the mobile device for one of a plurality of content management clients, wherein each of the different content management clients is configured to use content according to a corresponding one of the different content management protocols, and wherein the plurality of content management clients comprises a content management client configured to use content according to the open digital rights language protocol and a content management client configured to use content according to the extensible rights markup language protocol;

obtaining by the swapping component the requested content management client from a component that maintains the different content management protocols; and communicating by the swapping component the requested content management client to the mobile device, wherein the mobile device has limited memory resources and is only capable of storing less than all of the plurality of content management clients at a time.

* * * * *